United States Patent [19]

Smith

[11] Patent Number: 5,002,314

[45] Date of Patent: Mar. 26, 1991

[54] LOCKING ASSEMBLY FOR PUSH-ON FITTINGS

[76] Inventor: Arthur W. Smith, 732 Sylvan Dr., Fort Worth, Tex. 76112

[21] Appl. No.: 449,566

[22] Filed: Dec. 12, 1989

Related U.S. Application Data

[63] Continuation-in-part of Ser. No. 197,667, May 23, 1988.

[51] Int. Cl.$^5$ .............................................. F16L 25/00
[52] U.S. Cl. ......................................... 285/12; 285/45; 285/23; 285/318; 285/423; 285/351
[58] Field of Search ................. 285/45, 373, 419, 114, 285/318, 38, 411, 12, 177, 38, 23, 423, 351

[56] References Cited

U.S. PATENT DOCUMENTS

| | | | |
|---|---|---|---|
| 1,040,039 | 10/1912 | Shapro | 285/177 X |
| 3,527,478 | 9/1970 | Enssle | 285/38 |
| 4,429,907 | 2/1984 | Timmons | 265/373 X |
| 4,468,057 | 8/1984 | De Crombrugghe | 285/373 |
| 4,498,691 | 2/1985 | Cooke | 285/12 |
| 4,568,115 | 2/1986 | Zimmerly | 285/411 |
| 4,601,495 | 7/1986 | Webb | 285/423 X |
| 4,652,023 | 3/1987 | Timmons | 285/373 X |
| 4,728,130 | 3/1988 | Corzine | 285/318 X |
| 4,750,762 | 6/1986 | Corzine | 285/318 X |
| 4,795,197 | 1/1989 | Kaminski et al. | 285/419 X |

FOREIGN PATENT DOCUMENTS 2007791 5/1979 United Kingdom ................. 285/12

Primary Examiner—Dave W. Arola
Attorney, Agent, or Firm—Andrew J. Dillon

[57] ABSTRACT

An improved locking assembly is disclosed for securing the connection between a push-on fitting having a flared end which is fitted into a cage and surrounded by a garter-type coil spring housed within the cage. The locking assembly includes a generally cylindrical coupling having a knurled outer surface and a single radial slit therein. The coupling includes at least two hinges integrally formed in the outer circumference thereof wherein at least three independent bearing surfaces are formed when the coupling encircles the connection. A multi-step circumferential recess within the coupling is utilized to accommodate variations in the external dimensions of the cage and a circular clamp or single screw are utilized to urge the single radial slit into a mated relationship such that relative axial movement of the cage and push-on fitting is restricted by radial pressure exerted by the coupling. In one embodiment of the present invention, multiple sized connections are accommodated by inserting within the coupling a cylindrical insert having a single radial slit and at least two hinges formed therein which correspond to the single radial slit and at least two hinges within the coupling, so that smaller connections may be accommodated.

19 Claims, 2 Drawing Sheets

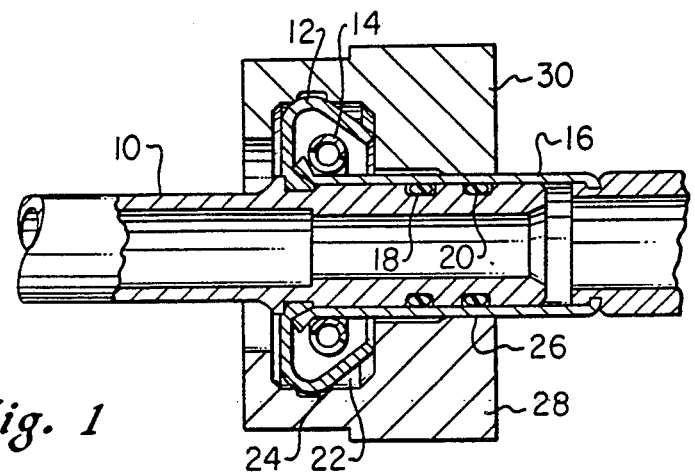
Fig. 1
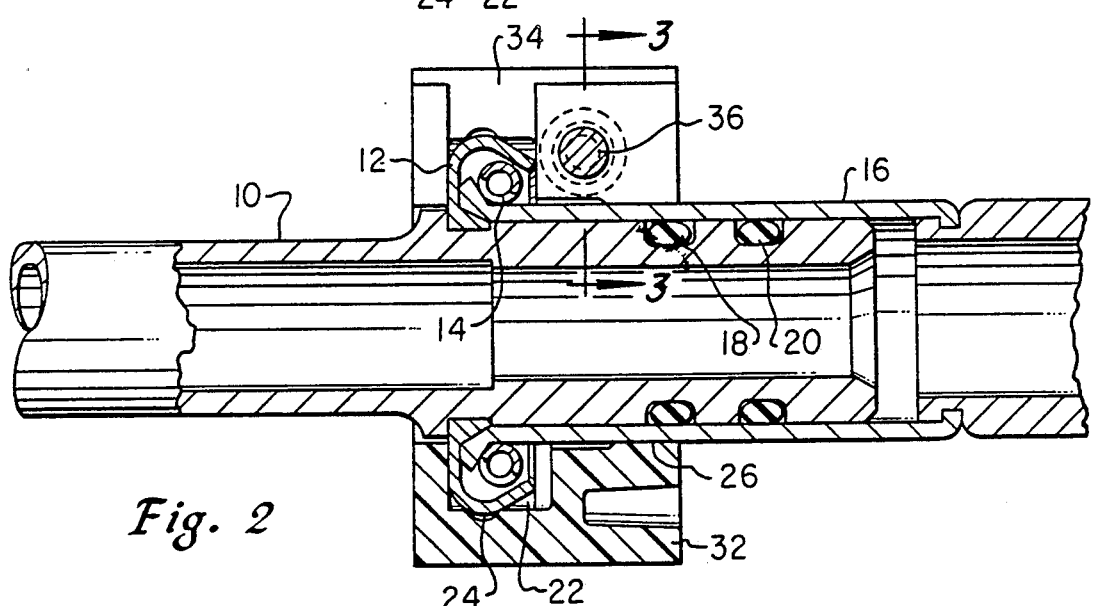
Fig. 2
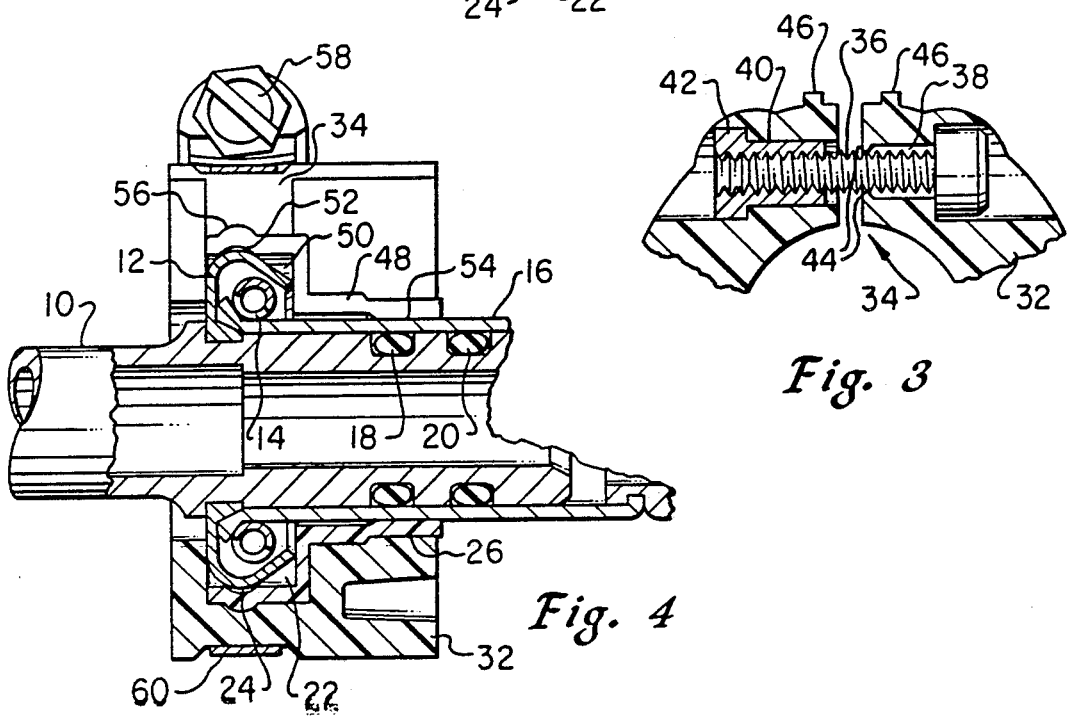
Fig. 3
Fig. 4

LOCKING ASSEMBLY FOR PUSH-ON FITTINGS

CROSS-REFERENCE TO RELATED APPLICATION

The present application is a continuation-in-part of U.S. patent application Ser. No. 07/197,667, filed May 23, 1988, now abandoned by the inventor hereof. That patent application is incorporated herein by reference thereto.

BACKGROUND OF THE INVENTION

1. Field of the Invention

This invention relates generally to the field of fluid line couplings and in particular to locking assemblies for utilization in fluid line couplings which use push-on fittings. Still more particularly, the present invention relates to locking assemblies which may be simply and easily applied to such fluid line couplings.

2. Description of the Prior Art

In U.S. Pat. No. 4,055,359, issued to McWethy, and assigned to Ford Motor Company of Deerborn, Mich., there is discloses a quick-connect tubular coupling known as the Springlock ®. The Ford Motor Company has utilized these push-on fittings with garter-type coil springs on automotive air conditioning fluid lines and fuel lines for some time. These push-on fittings utilize two mated couplings which incorporate O-rings to seal the connection between the two couplings and which are subject to failure due to vibration and wear.

The end of the push-on fitting, described in the above-referenced United States patent, is flared and sized to fit into a cage which houses a garter-type coiled spring. The fitting is pushed onto a pipe and over the O-rings mounted on the end of the pipe until the flared end of the push-on fitting enters the cage and forces the coil spring over the flared end of the pipe and down to encircle the fitting. The coil spring then prevents the fitting from being pulled out of the cage. Fluid within the line under pressure is sealed within the line by the O-rings which are situated between the pipe and the push-on fitting. Push-on fittings of this type have been used to connect a flexible hose to the condenser, evaporator, accumulator and the compressor of the automotive air conditioning systems manufactured and sold by the Ford Motor Company, and also for connections to the gasoline tank and fuel injection system or carburetor of such vehicle's fuel system.

The fluid lines of automotive air conditioning systems conventionally operate with pressures of at least one hundred p.s.i. and at high ambient temperatures, line pressures of three hundred p.s.i. are not uncommon. These pressures put severe strain upon the seal between the push-on fitting and the pipe to which the fitting is coupled, which often results in a high incidence of O-ring failures causing leaks in the system. Additionally, the constant vibration and movement of the flexible hose during the running of the vehicle's engine and the vehicle itself over the ground will force the fitting to move back and forth transverse to its axis, causing wear and eventual rupture of the seal between the O-rings and the inner surface of the push-on fitting.

Recently, U.S. Pat. No. 4,728,130, issued to George S. Corzine, disclosed a locking assembly for utilization with such push-on fittings which holds the fitting in axial alignment to prevent the wear and leaking associated with misalignment and vibration. The locking assembly disclosed in the aforementioned United States patent includes an axially split internally threaded locking nut and an axially split externally threaded male fitting. The axially split internally threaded locking nut is coupled around the cage of the fitting and secured utilizing several set screws. Next, the axially split externally threaded male fitting is threaded into the internal threads of the other fitting, axially forcing the flared lip of the push-on fitting into the cage containing the coil spring. In this manner, the two portions of the push-on fittings are forced together axially and vibration and misalignment are substantially reduced.

U.S. Pat. No. 4,750,762, issued to the aforementioned George S. Corzine, discloses a second locking assembly for utilization with such push-on fittings which utilizes radial pressure to attempt to prevent wear and leakage of the fitting. The locking assembly disclosed in this patent utilizes an axially split coupling which includes a recess adapted to fit around the cage of a push-on fitting and which is secured around the fitting by utilizing two set screws such that radial pressure is exerted upon the fitting with the tightening of the set screws.

A problem has developed with both of the aforementioned devices in that the tolerances necessary to promote axial alignment are difficult to obtain in view of the variances found in the external dimensions of these Ford push-on fittings.

Thus, should the cage containing the coil spring be slightly undersized or oversized, it is difficult to maintain the two fitting assemblies in axial alignment utilizing a locking assembly which has been machined for close tolerances. Further, the complexity of a four-piece locking assembly has made application of such locking assemblies in tight quarters difficult to accomplish under ideal conditions and impossible in certain circumstances.

The cross-referenced U.S. patent application Ser. No. 07/197,667, by the inventor hereof, discloses a technique for accommodating variations which may exist in the external dimensions of the various components of such push-on fittings. In the aforementioned patent application, an axially split coupling is provided which includes a first circumferential recess adapted to generally receive the cage of a push-on fitting. A second separate circumferential recess is provided within the first circumferential recess to accommodate small variations in the external dimensions of the spring cage and a step flange is also provided to accommodate variations in the push-on fitting itself. However, this locking assembly, as well as all known locking assemblies, suffers from the inherent difficulties associated with manipulating two separate locking assembly halves as well as multiple locking screws within the restricted areas of an engine compartment.

Therefore, it should be apparent that a need exists for a simplified locking assembly which can be utilized to maintain the axial alignment of such push-on fittings which does not need to be manufactured to the extreme tolerances necessary in known prior art designs and which may be easily and simply attached to a push-on fitting.

SUMMARY OF THE INVENTION

It is therefore one object of the present invention to provide an improved locking assembly for push-on fittings.

It is another object of the present invention to provide an improved locking assembly for push-on fittings which is simple to apply and secure.

It is yet another object of the present invention to provide an improved locking assembly for push-on fittings which is simple to apply and secure, and which will maintain axial alignment of the two fittings without the necessity for closely machined tolerances.

The foregoing objects are achieved as is now described. The locking assembly of the present invention is designed for utilization with a push-on fitting having a flared end which is fitted into a cage and surrounded by a garter-type coil spring housed within the cage. The locking assembly includes a generally cylindrical coupling having a knurled outer surface and a single radial slit therein. The coupling includes at least two hinges integrally formed in the outer circumference thereof wherein at least three independent bearing surfaces are formed when the coupling encircles the connection. A multi-step circumferential recess within the coupling is utilized to accommodate variations in the external dimensions of the cage and a circular clamp or single screw are utilized to urge the single radial slit into a mated relationship such that relative axial movement of the cage and push-on fitting is restricted by radial pressure exerted by the coupling. In one embodiment of the present invention, multiple sized connections are accommodated by inserting within the coupling a cylindrical insert having a single radial slit and at least two hinges formed therein which correspond to the single radial slit and at least two hinges within the coupling, such that smaller connections may be accommodated within a multi-step circumferential recess within the cylindrical insert.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a partially sectional view of a conventional push-on fitting coupled to a caged garter-type coil spring adapted to be mounted on an air conditioning condenser pipe and secured with an axially split locking assembly;

FIG. 2 is a sectional view showing one embodiment of the improved locking assembly of the present invention;

FIG. 3 is a partial sectional view of the improved locking assembly of FIG. 2, taken along line 3—3 of FIG. 2;

FIG. 4 is a sectional view showing a second embodiment of the improved locking assembly of the present invention.

DETAILED DESCRIPTION OF THE INVENTION

Figure 5:
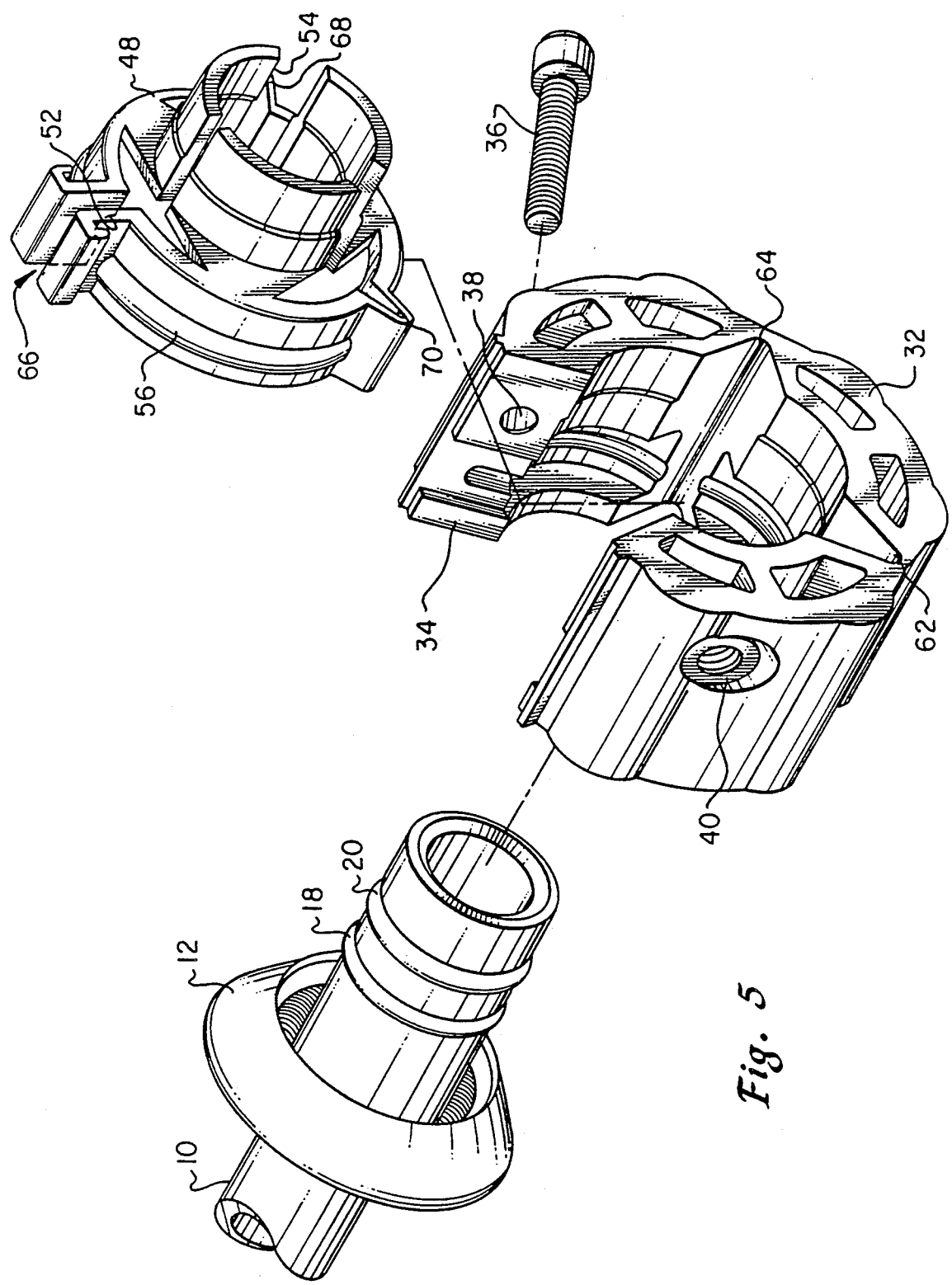
FIG. 5 is an exploded view of the major components of the improved locking assembly of the present invention, as depicted in FIG. 4.

With reference now to the figures and in particular with reference to FIG. 1 there is depicted a sectional view of a conventional "quick connect" push-on type fitting utilized by the Ford Motor Company on a large number of automotive refrigerant lines and certain fuel lines. Condenser pipe 10 includes a cage 12 which is formed or mounted on condenser pipe 10 and which houses a garter-type coil spring 14. Generally, a flexible hose (not shown) is coupled to pipe 10 by means of push-on fitting 16 which has an outwardly flaring end. In practice, fitting 16 is slidably engaged over pipe 10 over O-ring seals 18 and 20, which are mounted on pipe 10 in a pair of semicircular grooves, as is well known in the art.

The assembly of this quick connect push-on type fitting is accomplished by inserting the flared end of push-on fitting 16 into cage 12 until coil spring 14 is forced outward and over the flared end. Coil spring 14 will then prevent the removal of push-on fitting 16 without the utilization of a special tool. Despite this locking feature, the fluid within pipe 10 may leak due to the fact that pressures exceeding 100 p.s.i. are experienced in such systems and the fluid is sealed within pipe 10 only by the action of O-ring seals 18 and 20. The continued vibration and movement of this fitting due to engine and road vibration, coupled with rapid temperature changes, typically associated with such cooling systems, will tend to cause frequent failures of O-ring seals 18 and 20.

Still referring to FIG. 1, there is depicted a sectional view of an axially split locking assembly which may be utilized to secure the depicted push-on fitting. As may be seen, the prior art locking assembly includes an axially split recessed coupling having an upper half 30 and a lower half 28. Such axially split locking assemblies may be constructed of aluminum or other metallic materials. Coupling halves 28 and 30 include a plurality of circumferential recesses which are utilized to restrain transverse movement of the quick connect push-on fitting in a manner which will be described below.

Firstly, when coupling halves 28 and 30 are joined in the manner depicted, circumferential recess 22 serves to generally engage cage 12. Within circumferential recess 22 is a second circumferential recess 24 which serves to snugly engage the outermost edge of cage 12. The inside diameter of recess 24 is preferably selected to be slightly larger than the average external diameter of cage 12 so that small variations in the size of cage 12, which may occur during fabrication, will not effect the ability of the looking assembly to restrict the movement of cage 12.

Finally, coupling halves 28 and 30 also include a third circumferential recess 26 which is designed to snugly engage push-on fitting 16. Circumferential recess 26 generally has an inside diameter which is slightly smaller than the outside diameter of push-on fitting 16 in a stepped manner so that any taper in the outside diameter of push-on fitting 16 which results from the formation thereof may be accommodated. As those skilled in this art will appreciate, by providing circumferential recess 24 within recess 22 it is possible to prohibit transverse movement of cage 12 and, by securely engaging push-on fitting 16 within recess 26, the vibration and transverse movement which often causes failure of O-ring seals 18 and 20 may be substantially eliminated.

Referring now to FIG. 2, there is depicted a sectional view depicting one embodiment of the improved locking assembly of the present invention. As is illustrated, the locking assembly of FIG. 2 includes a one-piece generally cylindrical coupling 32 which is preferably constructed of a rigid temperature resistant plastic material, such as a material marketed by DuPont under the trade name ZYTEL. Coupling 32 includes a single radial slit 34 and a plurality of hinges (not shown) which permit coupling 32 to encircle the depicted connection. In this embodiment of the present invention, a screw 36 is utilized to urge both sides of radially slit 34 into a mated relationship, urging coupling 32 inward such that radially pressure is exerted upon the depicted connection. As is illustrated in FIG. 1, circumferential recess 22 includes a second circumferential recess 24 which accommodates variations in the exterior dimensions of cage 12. Similarly, third circumferential recess 26 permits variations in the external dimensions of push-on fitting 16 to be accommodated.

With reference now to FIG. 3, there is depicted a partial sectional view of the improved locking assembly of FIG. 2, taken along line 3—3 of FIG. 2. As is illustrated, screw 36 may be utilized to draw each side of radially slit 34 into a mated relationship by inserting screw 36 into a pair of aligned apertures 38 and 40. In the depicted embodiment of the present invention, a metallic threaded insert 42 is inserted into aperture 40 to enhance the rigidity of the resultant joint. Another important feature of the present invention is the provision of projections 44. Projections 44 permit screw 36 to be partially inserted into aperture 38 and retained therein. This feature permits coupling 32 to be slipped over the push-on connection without the necessity of locating and inserting a screw to secure the coupling. Additionally, lips 46 are provided to permit radial slit 34 to be manually opened to mount coupling 32 over the push-on connection.

Referring now to FIG. 4, there is depicted a sectional view showing a second embodiment of the improved locking assembly of the present invention. As is illustrated, coupling 32 still includes a first circumferential recess 22 and a second circumferential recess 24 to engage cage 12. However, to accommodate a smaller push-on fitting, coupling 32 is depicted with an insert 48 mounted therein. Insert 48 is preferably constructed of a rigid plastic thermal resistant material, similar to that material utilized to construct coupling 32. Additionally, insert 48 preferably includes a circumferential raised ridge 56 which is adapted to fit snugly into second circumferential recess 24 of coupling 32.

As discussed above, insert 48 preferably includes a circumferential recess 50 which is adapted to generally receive cage 12. To accommodate small variations in the external dimensions of cage 12, a second circumferential recess 52 is provided within insert 48 and operates in the manner described above. In the alternate embodiment depicted in FIG. 4, a second type of locking assembly is also illustrated. In this embodiment, a circular clamp 60, such as a hose clamp, is utilized to encircle coupling 32. In a manner well known in the clamp art, a screw 58 is then utilized to urge both halves of radial slit 34 into a mated relationship.

Finally, with reference now to FIG. 5, there is depicted an exploded view of the major components of the improved locking assembly of the present invention. As is illustrated, coupling 32 includes a pair of integrally formed live hinges 62 and 64 which, in combination with radial slit 34, permit coupling 32 to be opened a sufficient amount to encircle cage 12 without the necessity of breaking the connection formed thereat. In this manner, multiple bearing surfaces are formed on the inner surface of coupling 32 which may each exert radially directed pressure against the connection placed therein.

As is illustrated, insert 48 is also depicted and includes a pair of integrally formed live hinges 68 and 70 which correspond to live hinges 64 and 62 respectively. A radial slit 56 formed therein also corresponds to radial slit 34 of coupling 32. Thus, it should be apparent to those skilled in the art that upon the opening of coupling 32 and the insertion thereof of insert 48, coupling 32 may be utilized with push-on fittings of a smaller exterior dimension than those which may have previously been utilized with coupling 32.

As is illustrated, insert 48 preferably includes a raised circumferential ridge 56 which permits a snugly mated interface between insert 48 and circumferential recess 24 of coupling 32. Additionally, circumferential recess 52 and 54 within insert 48 will serve, in the manner described with each of the embodiments of the present invention, to accommodate small variations in the external dimensions of the push-on fitting while maintaining sufficient radial pressure thereon to restrict axial movement between cage 12 and push-on fitting 16 (not shown).

Upon reference to the foregoing, those skilled in the art will appreciate that the Applicant has provided a novel and useful locking assembly for utilization with a push-on fitting which may be simply and easily slipped over a push-on fitting and secured thereto without the necessity of utilizing multiple parts or loose locking mechanisms. By permitting minor exterior dimension variations in the push-on fittings to be secured and by providing a manner wherein the locking assembly may be simply and easily secured to the push-on connection, the Applicant has greatly enhanced the speed and efficiency with which a technician may apply such a locking assembly to the push-on fittings previously described.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A locking assembly for securing the connection between a push-on fitting having a flared end fitted into a cage and surrounded by a garter-type coil spring housed within the cage of a pipe with an O-ring sealing the connection between the push-on fitting and the pipe, said locking assembly comprising:

a generally cylindrical coupling adapted to surround said connection and having a single radial slit therein and at least two hinges formed in the circumference thereof, wherein at least three independent bearings surfaces are formed therein;

a first circumferential recess within said generally cylindrical coupling for generally engaging said cage;

a second circumferential recess located within said first circumferential recess, said second circumferential recess having a greater radial depth than said first circumferential recess and a width substantially smaller than the width of said first circumferential recess, said second circumferential recess for snugly engaging an outermost radial portion of said cage wherein variations in the external dimensions of said cage may be accommodated; and locking means for joining said single radial slit such that said at least three independent bearing surfaces are urged into contact with said push-on fitting wherein relative axial movement of said cage and said push-on fitting is restricted by radial pressure of said generally cylindrical coupling.

2. The locking assembly of claim 1 further including a pair of lips integrally formed along an exterior surface of said single radial slit wherein said slit may be manually urged open to encircle said connection.

3. The locking assembly of claim 1 wherein said at least two hinges formed in the circumference of said generally cylindrical coupling comprise at least two live hinges integrally formed within said generally cylindrical coupling.

4. The locking assembly of claim 1 wherein the outer surface of said generally cylindrical coupling is knurled for ease in manual manipulation thereof.

5. The locking assembly of claim 1 wherein said locking means comprises a circular clamp adapted to surround said generally cylindrical coupling such that engaging said circular clamp will urge said single radial slit into a mated relationship.

6. The locking assembly of claim 1 wherein said locking means comprises a single screw threaded into aligned apertures within said single radial slit such that rotation of said single screw will urge said single radial slit into a mated relationship.

7. The locking assembly of claim 6 wherein at least one of said aligned apertures includes multiple projections for retaining said single screw prior to threading said single screw into a second of said aligned apertures.

8. The locking assembly of claim 1 wherein said generally cylindrical coupling is constructed of a rigid temperature resistant plastic material.

9. A locking assembly for securing the connection between multiple sized push-on fittings, each having a flared end adapted to be fitted into multiple sized cages and surrounded by a garter-type coil spring housed within the cage of a pipe with an O-ring sealing the connection between the push-on fitting and the pipe, said locking assembly comprising:

a generally cylindrical coupling adapted to surround said connection and having a single radial slit therein and at least two hinges formed in the circumference thereof, wherein at least three independent bearing surfaces are formed therein;

a first circumferential recess within said generally cylindrical coupling for generally engaging a first sized cage;

a second circumferential recess located within said first circumferential recess, said second circumferential recess having a greater radial depth than said first circumferential recess and a width substantially smaller than the width of said first circumferential recess, said second circumferential recess for snugly engaging an outermost radial portion of a first sized cage wherein variations in the external dimensions of said first sized cage may be accommodated;

an insert adapted to be placed within said first circumferential recess, said insert having a third circumferential recess therein adapted to generally engage a second sized cage and a raised circumferential ridge about the exterior thereof adapted to mate snugly with said second circumferential recess;

a fourth circumferential recess located within said third circumferential recess, said fourth circumferential recess having a greater radial depth than said third circumferential recess and a width substantially smaller than the width of said third circumferential recess, said fourth circumferential recess for snugly engaging an outermost radial portion of a second sized cage wherein variations in the external dimensions of said second sized cage may be accommodated; and locking means for joining said single radial slit such that said at least three independent bearing surfaces are urged into contact with said push-on fitting wherein relative axial movement of a cage and a push-on fitting is restricted by radial pressure of said generally cylindrical coupling.

10. The locking assembly of claim 9 further including a pair of lips integrally formed along an exterior surface of said single radial slit wherein said slit may be manually urged open to encircle said connection.

11. The locking assembly of claim 9 wherein said at least two hinges formed in the circumference of said generally cylindrical coupling comprise at least two live hinges integrally formed within said generally cylindrical coupling.

12. The locking assembly of claim 9 wherein said insert includes a single radial slit therein and at least two hinges formed in the circumference thereof, corresponding to said single radial slit and said at least two hinges within said generally cylindrical coupling.

13. The locking assembly of claim 9 wherein the outer surface of said generally cylindrical coupling is knurled for ease in manual manipulation thereof.

14. The locking assembly of claim 9 wherein said locking means comprises a circular clamp adapted to surround said generally cylindrical coupling such that engaging said circular clamp will urge said single radial slit into a mated relationship.

15. The locking assembly of claim 9 wherein said locking means comprises a single screw threaded into aligned apertures within said single radial slit such that rotation of said single screw will urge said single radial slit into a mated relationship.

16. The locking assembly of claim 15 wherein at least one of said aligned apertures includes multiple projections for retaining said single screw prior to threading said single screw into a second of said aligned apertures.

17. The locking assembly of claim 9 wherein said generally cylindrical coupling is constructed of a rigid temperature resistant plastic material.

18. A locking assembly for securing the connection between a push-on fitting having a flared end fitted into a cage and surrounded by a garter-type coil spring housed within the cage of a pipe with an O-ring sealing the connection between the push-on fitting and pipe, said locking assembly comprising:

an axially split and recessed coupling;

a first circumferential recess with said axially split and recessed coupling for generally engaging said cage;

a second circumferential recess located within said first circumferential recess, said circumferential recess having a greater radial depth than said first circumferential recess and a width substantially smaller than the width of said first circumferential recess, said second circumferential recess for snugly engaging an outermost radial portion of said cage wherein variations in the external dimensions of said cage may be accommodated; and locking means for securely joining said axially split and recessed coupling wherein relative axial movement of said cage and said pushing-on fitting is restricted by radial pressure of said coupling.

19. The locking assembly according to claim 18, further including a third recess within said axially split and recessed coupling having a stepped radial depth for encircling said push-on fitting wherein variations in the external diameter of said push-on fitting may be accommodated.

* * * * *